United States Patent
Aposhian et al.

(10) Patent No.: US 10,939,615 B2
(45) Date of Patent: Mar. 9, 2021

(54) ADJUSTABLE MOWER DECK

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., North Salt Lake, UT (US)

(*) Notice: Subject to any disclaimer, the term of this patent is extended or adjusted under 35 U.S.C. 154(b) by 433 days.

(21) Appl. No.: 15/795,065

(22) Filed: Oct. 26, 2017

(65) Prior Publication Data
US 2019/0124836 A1    May 2, 2019

(51) Int. Cl.
| | | |
|---|---|---|
| A01D 34/74 | (2006.01) | |
| A01D 34/81 | (2006.01) | |
| A01D 101/00 | (2006.01) | |
| A01D 34/66 | (2006.01) | |

(52) U.S. Cl.
CPC ............. *A01D 34/74* (2013.01); *A01D 34/81* (2013.01); *A01D 34/66* (2013.01); *A01D 2101/00* (2013.01)

(58) Field of Classification Search
CPC ........ A01D 34/74; A01D 34/66; A01D 34/81; A01D 2100/00; A01D 2101/00; A01D 34/24–246; A01D 34/54; A01D 34/64
See application file for complete search history.

(56) References Cited

U.S. PATENT DOCUMENTS

| | | | | |
|---|---|---|---|---|
| 2,568,822 A | * | 9/1951 | Pervis | A01D 34/74 56/17.2 |
| 2,838,900 A | * | 6/1958 | Laughlin | A01D 34/74 56/14.7 |
| 2,848,859 A | * | 8/1958 | Abel | A01D 34/74 56/17.2 |
| 3,269,100 A | * | 8/1966 | Smith | A01D 34/74 56/17.2 |
| 3,357,715 A | * | 12/1967 | Plamper | A01D 34/74 280/43.13 |
| 3,677,574 A | * | 7/1972 | Cyr | A01D 34/74 280/43.13 |

(Continued)

FOREIGN PATENT DOCUMENTS

| | | | | |
|---|---|---|---|---|
| CH | 617827 A5 | * | 6/1980 | ............ A01D 34/74 |
| EP | 1749432 A1 | * | 2/2007 | ............ A01D 34/74 |

*Primary Examiner* — Thomas B Will
*Assistant Examiner* — Joan D Misa
(74) *Attorney, Agent, or Firm* — Kirton McConkie; Brian Tucker

(57) ABSTRACT

A mower deck can include a linkage that enables adjusting the height of the mower deck with a single action. The mower deck can include a rolling mechanism support arm at each corner and a coupling mechanism that extends between the front and rear rolling mechanism support arms on each side of the mower deck. A shaft can extend between the two front rolling mechanism support arms and can be rotated via an actuator. When the shaft is rotated, the front rolling mechanism support arms will rotate in unison, and the coupling mechanisms will cause the rear rolling mechanism support arms to also rotate in unison. In this way, a single action can cause the height of the mower deck to be adjusted.

20 Claims, 7 Drawing Sheets

(56) References Cited

U.S. PATENT DOCUMENTS

| | | | | |
|---|---|---|---|---|
| 4,135,457 A * | 1/1979 | Willis | A01B 63/166 | 111/136 |
| 4,315,396 A * | 2/1982 | Oka | A01D 34/828 | 56/320.1 |
| 4,321,784 A * | 3/1982 | Wood | A01D 34/74 | 280/43.13 |
| 4,785,612 A * | 11/1988 | Morishita | A01D 34/69 | 56/11.8 |
| 4,835,952 A * | 6/1989 | McLane | A01D 34/74 | 280/43.13 |
| 4,905,463 A * | 3/1990 | Eilles | A01D 34/74 | 280/43.13 |
| 5,526,633 A * | 6/1996 | Strong | A01D 34/74 | 280/43.13 |
| 5,816,033 A * | 10/1998 | Busboom | A01D 34/74 | 56/10.8 |
| 5,946,893 A * | 9/1999 | Gordon | B60G 3/01 | 56/15.7 |
| 6,047,530 A * | 4/2000 | Bednar | A01D 75/30 | 56/13.6 |
| 6,085,508 A * | 7/2000 | Miatt | A01D 34/74 | 56/15.5 |
| 6,336,312 B1 * | 1/2002 | Bednar | A01D 34/74 | 56/13.6 |
| 6,378,280 B1 * | 4/2002 | Bone | A01D 34/74 | 280/43.13 |
| 7,395,648 B1 * | 7/2008 | Silbernagel | A01D 34/54 | 56/17.2 |
| 7,448,191 B2 * | 11/2008 | Elhardt | A01D 34/74 | 56/17.1 |
| 7,478,519 B2 * | 1/2009 | Phillips | A01D 34/661 | 56/15.9 |
| 7,716,907 B2 * | 5/2010 | Joliff | A01D 34/74 | 56/17.1 |
| 8,297,032 B2 * | 10/2012 | Ninomiya | A01D 34/74 | 56/17.2 |
| 8,371,095 B2 * | 2/2013 | Grewe | A01D 34/74 | 56/17.1 |
| 9,301,444 B2 * | 4/2016 | Campbell | A01D 34/74 | |
| 9,775,288 B2 * | 10/2017 | Steen | A01D 34/71 | |
| 2019/0150359 A1 * | 5/2019 | Gust | A01D 34/54 | |
| 2019/0150360 A1 * | 5/2019 | Aposhian | A01D 34/74 | |

\* cited by examiner

ADJUSTABLE MOWER DECK

CROSS-REFERENCE TO RELATED APPLICATIONS

N/A

BACKGROUND

Golf courses, sod farms, and other establishments with expansive grassy areas typically employ large commercial mowers to cut grass. A typical commercial mower may include multiple "mower decks" that house the cutting blades. Unlike a common residential mower, the mower deck of commercial mowers typically houses multiple (e.g., 2-4) cutting blades.

Mower decks typically have a rectangular shape with four wheels at the corners or front and rear rollers that support the mower deck above the ground. The wheels or rollers are typically mounted to the mower deck in a manner that allows the height of the mower deck relative to the ground to be adjusted thereby allowing grass to be cut at different lengths. With current mower decks, the process of adjusting the height of the mower deck can be difficult. For example, in many cases, a mower deck is configured to allow the wheels or rollers to be bolted to the deck at one of various vertical positions. In such cases, the height of the mower deck can be adjusted by removing/loosening the bolts, adjusting each wheel/roller to the desired height, and finally replacing/tightening the bolts. Even with a single mower deck, this process can be time consuming. Furthermore, anytime the wheels or rollers are adjusted, it is critical to ensure that the mower deck remains level which further complicates the process.

BRIEF SUMMARY

The present invention extends to a mower deck that includes a linkage that enables adjusting the height of the mower deck with a single action. The mower deck can include a rolling mechanism support arm at each corner and a coupling mechanism that extends between the front and rear rolling mechanism support arms on each side of the mower deck. A shaft can extend between the two front rolling mechanism support arms and can be rotated via an actuator. When the shaft is rotated, the front rolling mechanism support arms will rotate in unison, and the coupling mechanisms will cause the rear rolling mechanism support arms to also rotate in unison. In this way, a single action can cause the height of the mower deck to be adjusted.

In one embodiment, the present invention is implemented as a mower deck that includes: a main body having a front side, a rear side, a left side and a right side, the main body housing one or more cutting blades; for each of the left and right sides, a front and a rear rolling mechanism support arm pivotally connected to the main body, each rolling mechanism support arm supporting a rolling mechanism; a shaft that extends along the front side to couple the front rolling mechanism support arms together; and for each of the left and right sides, a coupling mechanism that couples the corresponding front rolling mechanism support arm to the corresponding rear rolling mechanism support arm such that, when the shaft is rotated, the front and rear rolling mechanism support arms are pivoted in equal increments.

In another embodiment, the present invention is implemented as a mower that includes one or more mower decks. Each mower deck comprises: a main body having a front side, a rear side, a left side and a right side, the main body housing one or more cutting blades; for each of the left and right sides, a front and a rear rolling mechanism support arm pivotally connected to the main body, each rolling mechanism support arm supporting a rolling mechanism; a shaft that extends along the front side to couple the front rolling mechanism support arms together; and for each of the left and right sides, a coupling mechanism that couples the corresponding front rolling mechanism support arm to the corresponding rear rolling mechanism support arm such that, when the shaft is rotated, the front and rear rolling mechanism support arms are pivoted in equal increments.

In another embodiment, the present invention is implemented as a mower deck that includes: a main body housing one or more cutting blades; a first pair of front and a rear rolling mechanism support arms that are pivotally connected to a first side of the main body; a second pair of front and a rear rolling mechanism support arms that are pivotally connected to a second side of the main body opposite the first side; a first coupling mechanism for the first pair of front and rear rolling mechanism support arms, the first coupling mechanism coupling the front rolling mechanism support arm to the rear rolling mechanism support arm such that, when the front rolling mechanism support arm is pivoted, the rear rolling mechanism support arm is also pivoted to cause a height of rolling mechanisms coupled to the front and rear rolling mechanism support arms to be adjusted equally; and a second coupling mechanism for the second pair of front and rear rolling mechanism support arms, the second coupling mechanism coupling the front rolling mechanism support arm to the rear rolling mechanism support arm such that, when the front rolling mechanism support arm is pivoted, the rear rolling mechanism support arm is also pivoted to cause a height of rolling mechanisms coupled to the front and rear rolling mechanism support arms to be adjusted equally.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a mower deck that includes a linkage that enables adjusting the height of the mower deck with a single action. The present invention therefore enhances the efficiency of operating a mower particularly in cases where grass may be cut at various lengths. The present invention can provide these enhancements in efficiency while also ensuring that the mower deck is maintained level after an adjustment.

Figure 1:
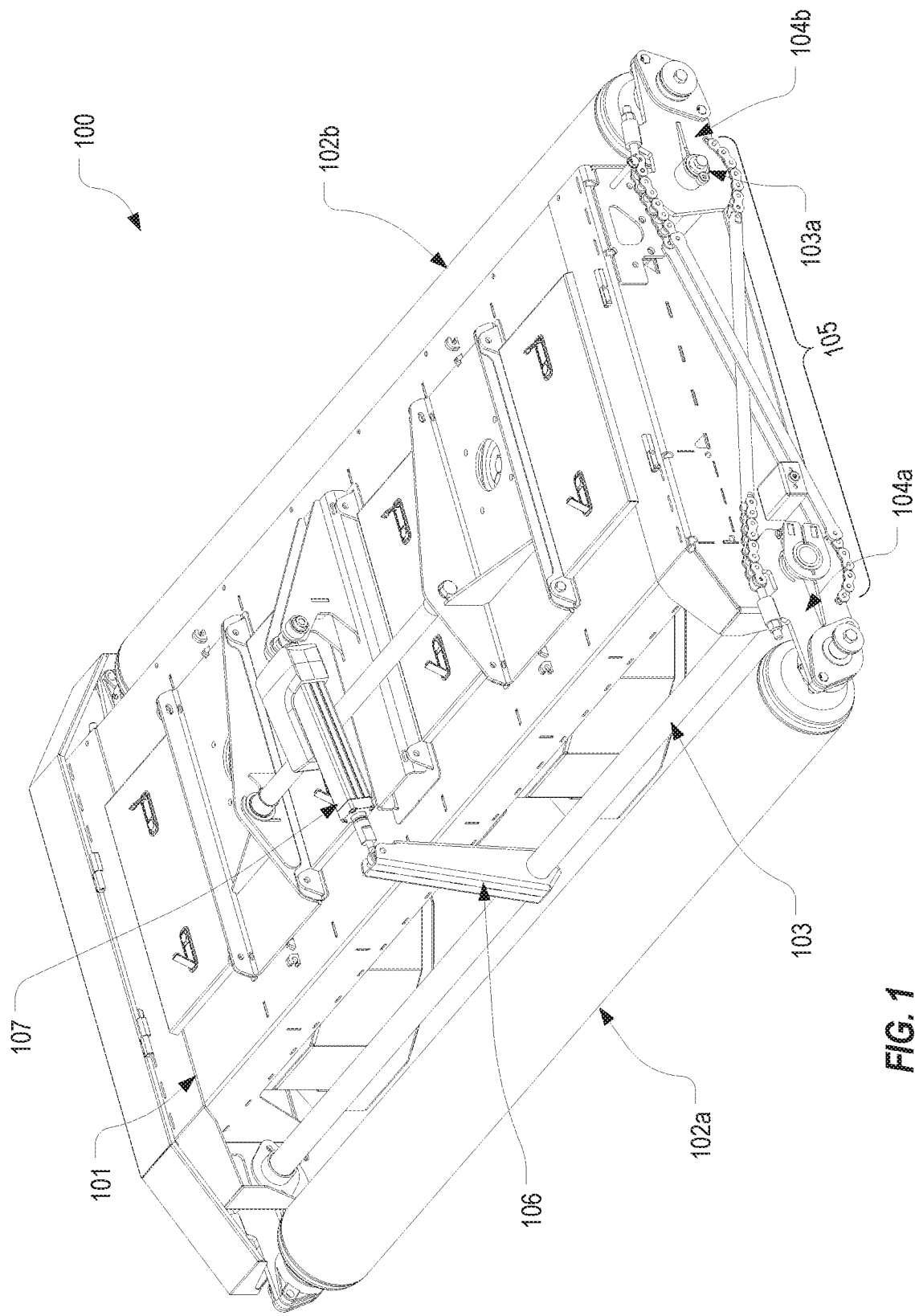
FIG. 1 illustrates a perspective view of a mower deck that is configured in accordance with embodiments of the present invention.
Figure 2:
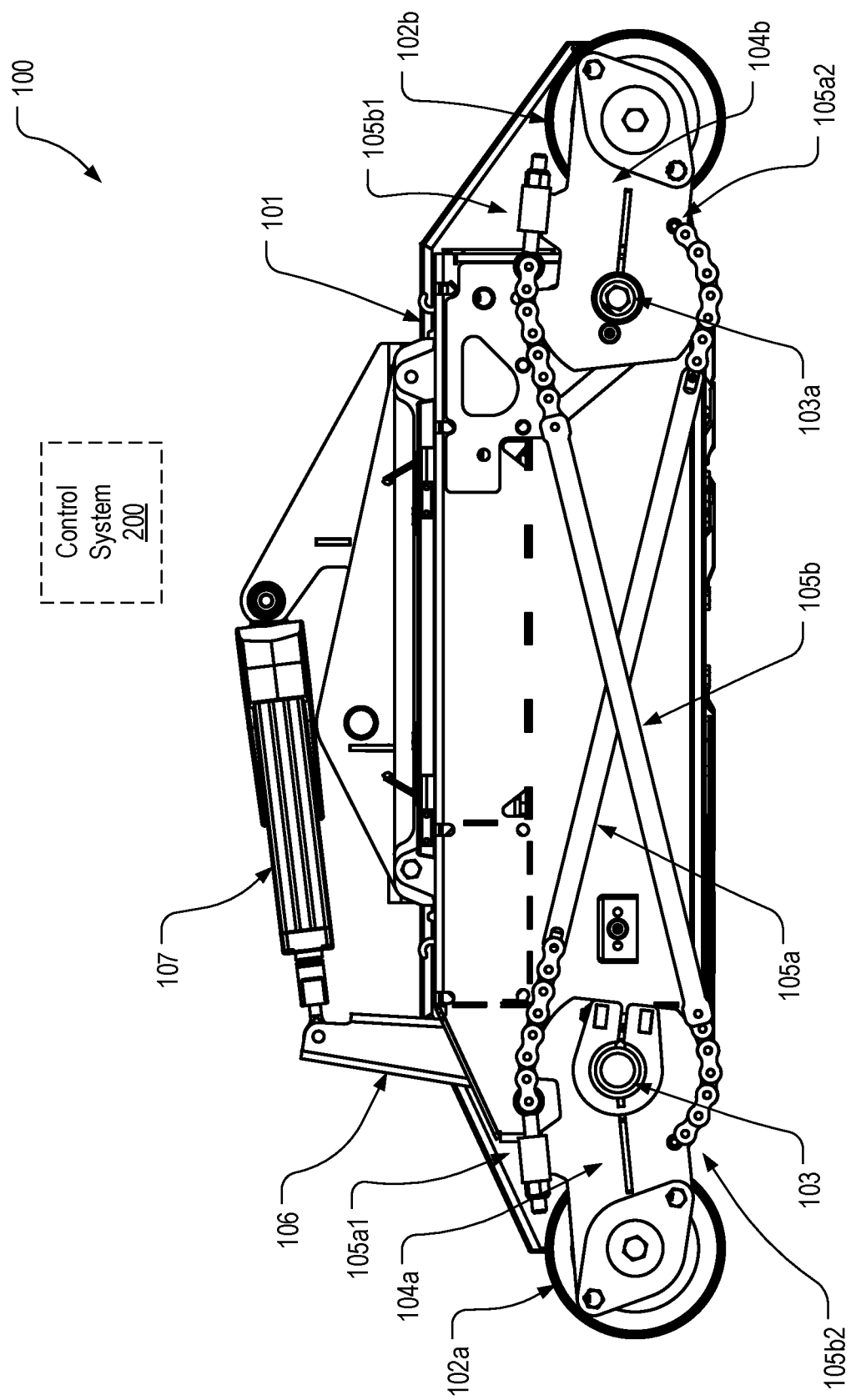
FIG. 2 illustrates a side view of the mower deck of FIG. 1.

FIG. 1 provides a perspective view and FIG. 2 provides a side view of a mower deck 100 that is configured in accordance with one or more embodiments of the present invention. As shown, mower deck 100 includes a main body 101 which houses a number of cutting blades (which in this case is four). It is noted that, in FIG. 1, various panels have been removed to allow the components that are the subject of the present invention to be visible. Main body 101 is supported off the ground by rollers 102a, 102b. However, in other embodiments, rollers 102a, 102b may be replaced by wheels. In this specification and the claims, the term "rolling mechanism" will be used to generally represent rollers, wheels or another structure that can be used to roll a mower deck along the ground. Accordingly, although the figures show embodiments that employ front and rear rollers, the present invention should not be limited by the type or number of rolling mechanisms that the mower deck employs.

At each front corner of main body 101, a front rolling mechanism support arm 104a is coupled to the main body, while at each rear corner of main body 201, a rear rolling mechanism support arm 104b is coupled to the main body. The terms "front" and "rear" are relative terms used only to distinguish between two opposing sides of main body 101 and should not be construed as requiring the front side to be "in front" when the mower is travelling in a forward direction. Each rolling mechanism support arm 104a/104b (or collectively rolling mechanism support arms 104) is configured to support a rolling mechanism. In the depicted embodiment, front rolling mechanism support arms 104a are coupled to opposing ends of front roller 102a while rear rolling mechanism support arms 104b are coupled to opposing ends of rear roller 102b. As mentioned above, if rollers 102a, 102b are replaced with wheels, each rolling mechanism support arm 104 would be coupled to a separate wheel.

As can be seen, the height of main body 101 relative to the ground is controlled by the position of rolling mechanism support arms 104. As will be explained below, the present invention provides a linkage that enables each of rolling mechanism support arms 104 to be adjusted in unison with a single action thereby increasing the efficiency of adjusting the cutting height of a mower.

As best seen in FIG. 1, a shaft 103 extends between and is coupled to front rolling mechanism support arms 104a. Shaft 103 is coupled to front rolling mechanism support arms 104a such that, when shaft 103 rotates, front rolling mechanism support arms 104a pivot in unison. In other words, front rolling mechanism support arms 104a are configured to pivot around the axis of shaft 103. Each rear rolling mechanism support arm 104b is coupled to main body 101 via a pivoting connection 103a so that they pivot in a similar manner. Although not visible, there is no shaft that extends between rear rolling mechanism support arms 104b.

An actuating arm 106 can be coupled to shaft 103 at one end and to an actuator 107 at the other end. Actuator 107 functions to rotate shaft 103 in response to user input or another control signal (e.g., from control system 200). Actuator 107 is a linear actuator that causes actuating arm 106 to pivot around the axis of shaft 103. It is noted, however, that many other actuator configurations could equally be employed such as a rotary motor that turns a gear that is coupled to shaft 103. Accordingly, the manner in which shaft 103 is caused to be rotated is not essential to the present invention. Of importance is the fact that shaft 103 causes both front rolling mechanism support arms 104a to be pivoted in equal increments such that the height of the front of main body 101 will be adjusted equally.

The linkage of the present invention further includes a coupling mechanism 105 on each side of main body 101 which couples the corresponding front and rear rolling mechanism support arms 104a, 104b. Although the figures illustrate a single side, the same coupling mechanism 105 could be employed on the non-depicted side. Coupling mechanism 105 is configured to cause each rear rolling mechanism support arm 104b to be pivoted in unison with the front rolling mechanism support arms 104a. As a result, when actuator 107 is actuated, each rolling mechanism support arm 104 will pivot in equal increments to thereby adjust the height of each corner of main body 101 in unison.

As is best seen in FIG. 2, coupling mechanism 105 includes a linking member 105a that is connected between front rolling mechanism support arm 104a and rear rolling mechanism support arm 104b. Specifically, front end 105a1 of linking member 105a is coupled at the top of front rolling mechanism support arm 104a (i.e., above shaft 103) while rear end 105a2 of linking member 105a is coupled at the bottom of rear rolling mechanism support arm 104b (i.e., below pivoting connection 103a).

Because front end 105a1 is connected to front rolling mechanism support arm 104a above shaft 103, when shaft 103 is turned to cause roller 102a to be lowered relative to main body 101 (which would be counterclockwise in FIG. 2), linking member 105a will be pulled in a frontward direction. Similarly, because rear end 105a2 is connected to rear rolling mechanism support arm 104b below pivoting connection 103a, the frontward movement of linking member 105a will cause rear rolling mechanism support arm 104b to rotate in a direction opposite to the direction in which front rolling mechanism support arm 104a is rotating (which in this case is clockwise in FIG. 2).

Coupling mechanism 105 and rolling mechanism support arms 104 can be configured such that the rotation of front rolling mechanism support arm 104a causes an equal amount of rotation of rear rolling mechanism support arm 104b. For example, the distance between the axis of shaft 103 and the point where front end 105a1 couples to front rolling mechanism support arm 104a can substantially match the distance between the axis of pivoting connection 103a and the point where rear end 105a2 couples to rear rolling mechanism support arm 104b (assuming the support arms are configured to space the rollers 102a and 102b equally from shaft 103 and pivoting connection 103a respectively). Accordingly, when shaft 103 is rotated a specified amount, each end of rollers 102a, 102b will be adjusted in the same increment. Because shaft 103 can be rotated by actuator 107, a single action can accomplish this adjustment to the cutting height of mower deck 100.

Linking member 105a also functions to prevent rear rolling mechanism support arm 104b from pivoting upwardly. With mower deck 100 on the ground, the weight of mower deck 100 would tend to cause rear rolling mechanism support arm 104b to pivot upwardly. However, linking member 105a opposes this upward pivoting. In other words, rear rolling mechanism support arm 104b can only pivot upwardly (which would be counterclockwise in FIG. 2) when front rolling mechanism support arm 104a pivots upwardly (which would be clockwise in FIG. 2) in the same amount.

In some embodiments, such as the depicted embodiments, coupling mechanism 105 can also include a support member 105b. As shown, support member 105b can in essence be the inverse of linking member 105a such that the combination of linking member 105a and support member 105b forms a FIG. 8 shape. In particular, rear end 105b1 of support member 105b is coupled at the top of rear rolling mechanism support arm 104b while front end 105b2 of support member 105b is coupled at the bottom of front rolling mechanism support arm 104a. The primary role of support member 105b is to retain the position of rear rolling mechanism support arm 104b when mower deck 100 is lifted off the ground. For example, if mower deck 100 is lifted, gravity will tend to cause rear rolling mechanism support arm 104b to pivot downwardly. However, because of how support arm is coupled between front rolling mechanism support arm 104a and rear rolling mechanism support arm 104b, rear rolling mechanism support arm 104b will not be able to pivot downwardly unless front rolling mechanism support arm 104a is pivoted downwardly in the same amount.

Figure 2A:
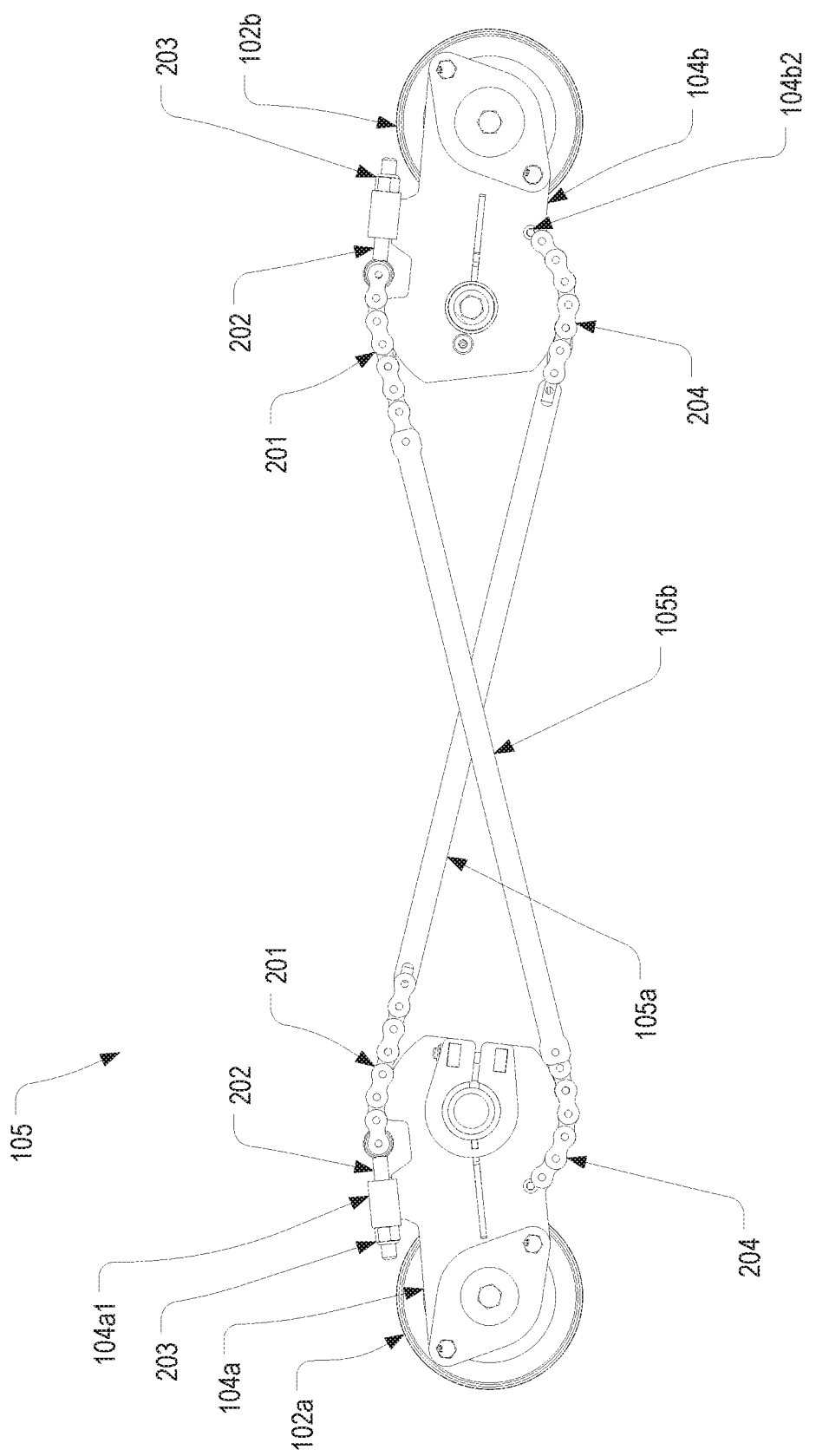
FIG. 2A illustrates an isolated view of the linkage employed by the mower deck of FIG. 1 when the mower deck includes rollers.

FIG. 2A provides an isolated view of various components of coupling mechanism 105. In some embodiments, linking member 105a can include pivoting portions 201, 204 on opposing ends. For example, pivoting portions 201, 204 could comprise a number of chain links at opposing ends of a rigid bar or bars. A benefit of configuring linking member 105a with pivoting portions 201, 204 is that the pivoting portions can conform to the relatively circular edges of the corresponding rolling mechanism support arm 104 to thereby provide greater stability and accuracy of rotation. Support member 105b can likewise be configured with pivoting portions 201, 204.

Figure 2B:
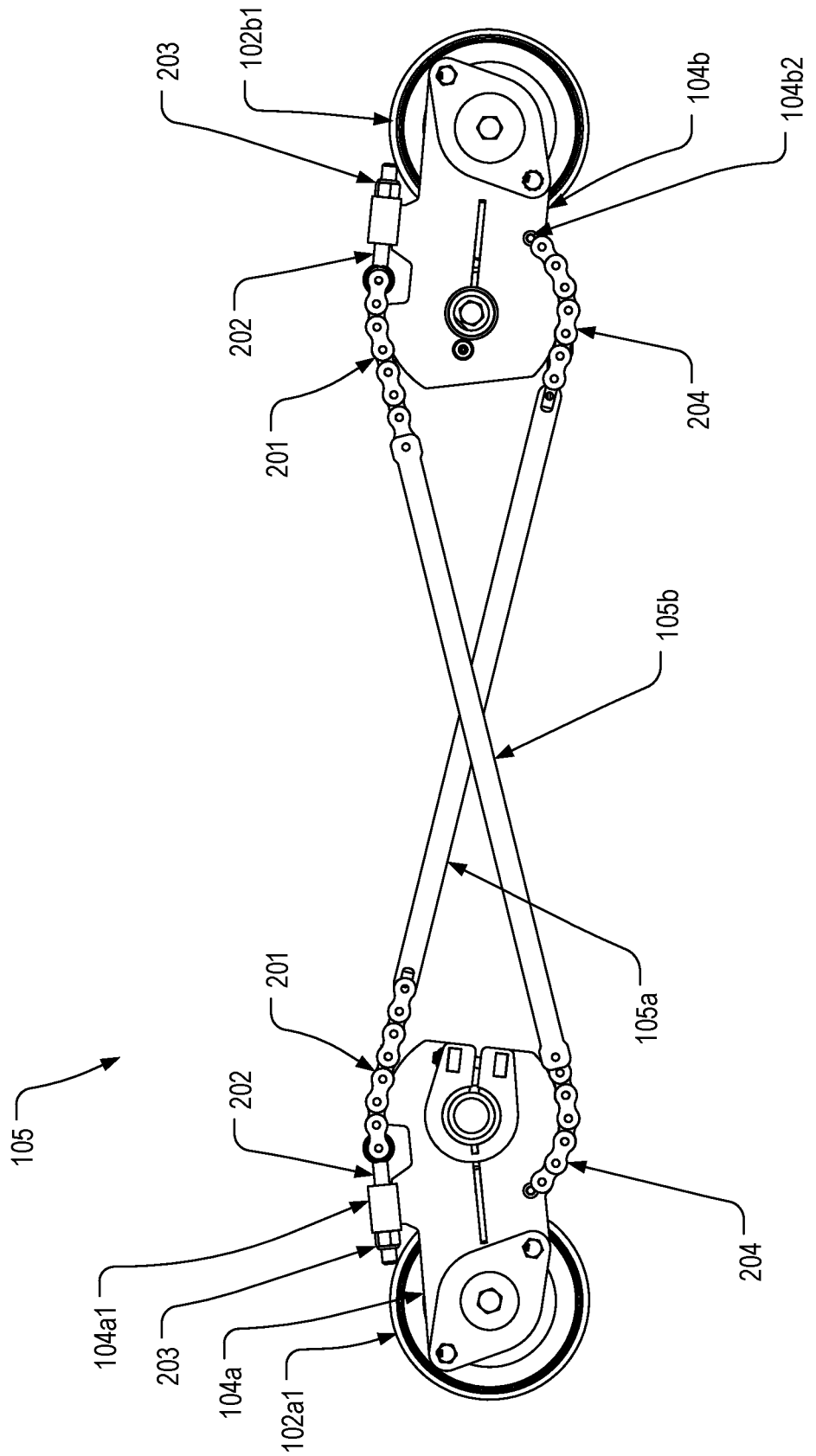
FIG. 2B illustrates an isolated view of the linkage employed by the mower deck of FIG. 1 when the mower deck includes wheels.

FIGS. 2A and 2B also illustrate how coupling mechanism 105 can enable mower deck to be leveled when the mower deck includes rollers 102a, 102b and wheels 102a1, 102b1 respectively. It is typically desirable for main body 101 to be leveled to prevent grass from being cut unevenly. The level of main body 101 is primarily determined by the relative positions of rolling mechanism support arms 104. Because front rolling mechanism support arms 104a are both coupled to shaft 103, their positions should remain in alignment. In contrast, the position of rear rolling mechanism support arm 104b relative to front rolling mechanism support arm 104a is only constrained by coupling mechanism 105. It is therefore desirable to perform an initial configuration of coupling mechanism 105 to ensure that each rear rolling mechanism support arm 104b is properly leveled relative to front rolling mechanism support arms 104a.

This leveling is accomplished by adjusting the length of linking member 105a between coupling point 104a1 and coupling point 104b2. In the depicted embodiment, this length of linking member 105a is adjustable at coupling point 104a1, but the adjustability could also or alternatively be provided at coupling point 104b2. As shown, coupling point 104a1 comprises a socket 104a1 through which a bolt 202 of linking member 105a inserts. A nut 203 can then be threaded onto bolt 202 to a position that will cause the position or rear rolling mechanism support arm 104b to align with front rolling mechanism support arm 104a. In particular, because of shaft 103, the orientation of front rolling mechanism support arm 104a will be fixed such that the shortening of linking member 105a will cause rear rolling mechanism support arm 104b to pivot downwardly. The adjustment of nut 203 can be performed while mower deck 100 is on a known flat surface such that, once main body 101 is level, it can be determined that rolling mechanism support arms 104 are in alignment. Once the length of linking member 105a has been set appropriately, the length of support member 105b can be set in a corresponding manner. For example, nut 203 on support member 105b can be tightened to remove any slack to prevent rear rolling mechanism support arm 104b from sagging when mower deck 100 is lifted.

Figure 3A:
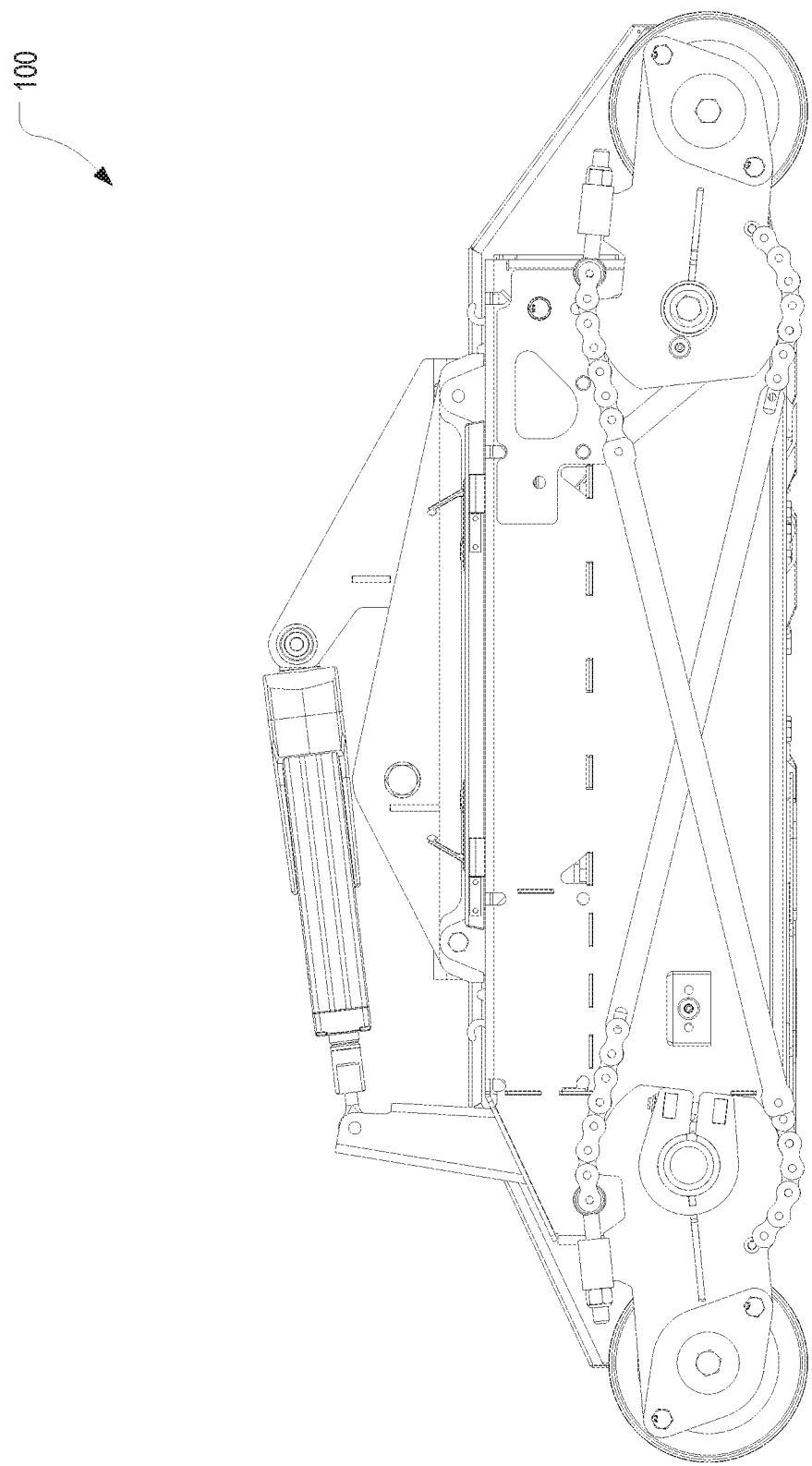
FIGS. 3A-3C illustrate the mower deck of FIG. 1 at three different heights.
Figure 3B:
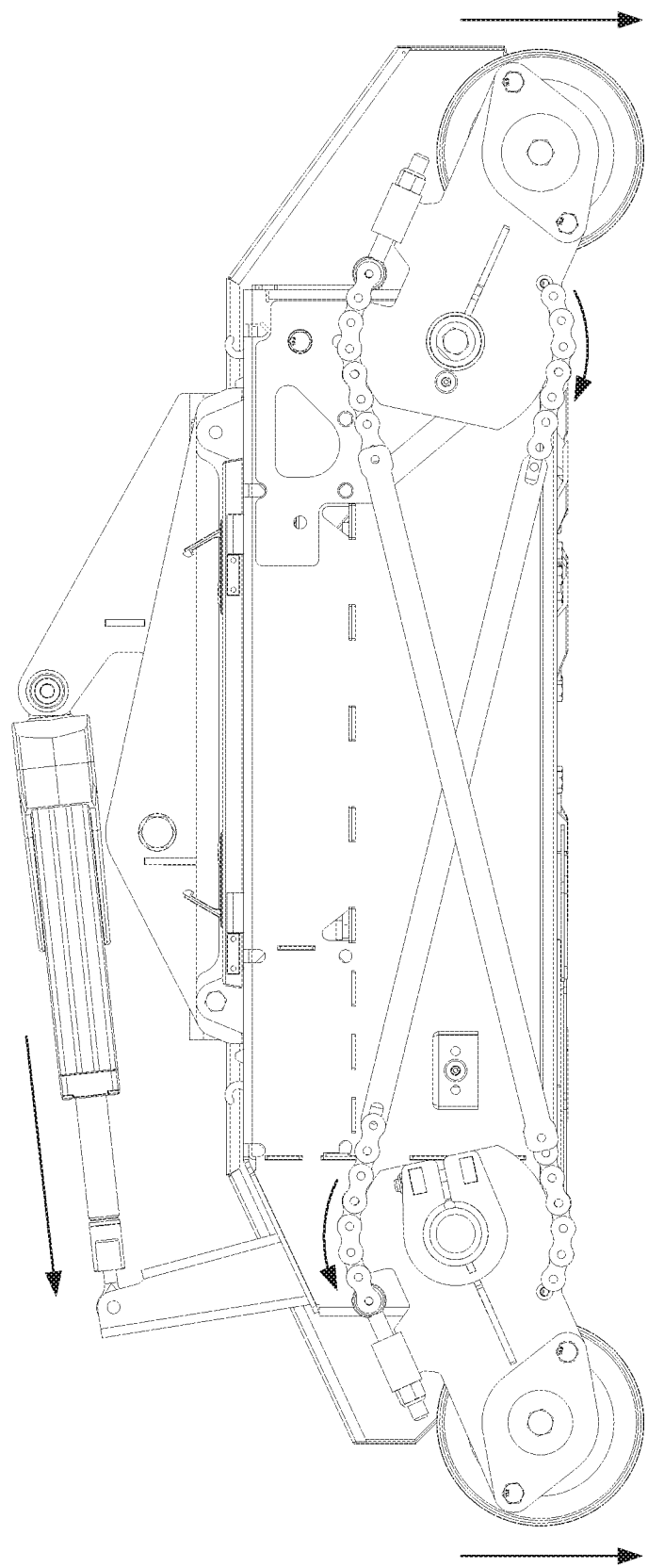
Figure 3C:
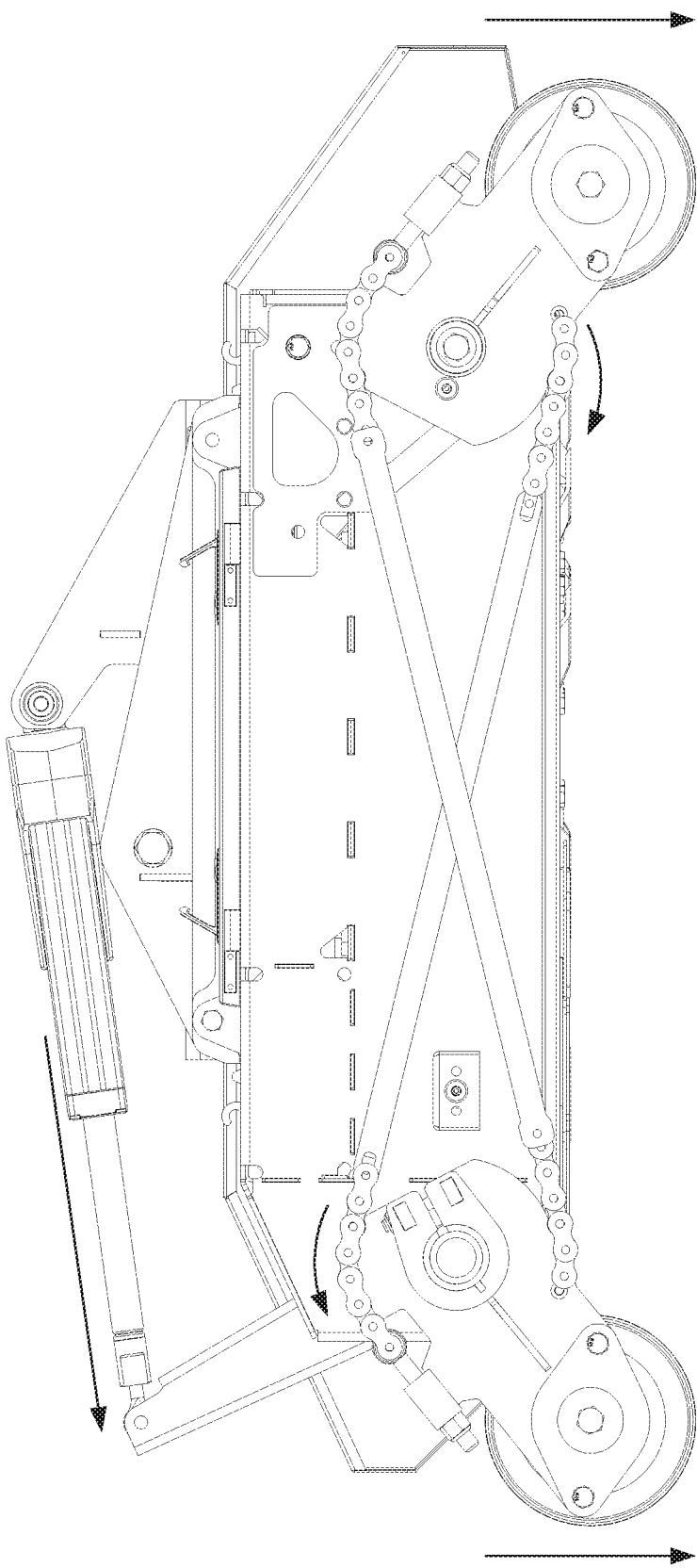

FIGS. 3A-3C illustrate mower deck 100 at three different cutting heights. As indicated by the arrows in FIGS. 3B and 3C, when actuator 107 is extended, shaft 103 rotates and, due to coupling mechanism 105, front and rear rolling mechanism support arms 104a, 104b also rotate in unison in the indicated directions to thereby raise the cutting height.

In some embodiments, a mower may include one or more mower decks 100 and provide a control mechanism for adjusting the cutting height of each mower deck. For example, a user interface (e.g., a button, lever, touch screen, etc.) may be provided on the mower to allow the user to select a particular cutting height. In response to user input that specifies a particular height, the control mechanism may provide a control signal to each actuator 107 on each mower deck 100 to cause each actuator 107 to rotate each shaft 103 in the corresponding amount. As can be seen, the present invention can greatly simplify the process of adjusting the cutting height of a mower, particularly when the mower has more than one mower deck.

Although the figures depict an embodiment of the linkage that employs a single shaft 103 and a coupling mechanism 105 on each side of mower deck 100, the linkage could alternatively be designed with two shafts and a coupling mechanism on only one side. For example, with reference to the figures, mower deck could include a rear shaft that couples rear rolling mechanism support arms 104b together in the same manner that shaft 103 couples front rolling mechanism support arms 104a together. In such cases, a coupling mechanism (e.g., coupling mechanism 105) could couple together front and rear rolling mechanism support arms 104a/104b only on one side. When adjusting the height of the mower deck, the rear shaft could be actuated in a similar manner as shaft 103. For example, a separate actuator can be used to rotate the rear shaft synchronously with shaft 103, or a coupling can be integrated between shaft 103 and the rear shaft such that the rear shaft will be rotated when shaft 103 is rotated. When a coupling is used, the coupling can preferably be positioned towards the middle of the two shafts to minimize torsion to the rear shaft. In other words, if the coupling is positioned at one side of the rear shaft, the torsion to the rear shaft may cause the rear rolling mechanism support arm on the opposing side of the rear shaft to sag.

In these two-shaft, single coupling mechanism embodiments, leveling of the mower deck will be accomplished in much the same manner as described above except that the two shafts will synchronize the level across the front and rear of the mower deck while the coupling mechanism will synchronize the level between the front and rear. Although each of the above described embodiments is suitable for maintaining the level of a mower deck while also enabling a single action adjustment to the level, embodiments that employ a single shaft that is positioned on the forward-facing side of the mower deck (where the forward-facing side would be the side facing forward while the mower is traveling forward) may be preferable in many implementations since a shaft on the rearward-facing side will likely collect grass clippings which can hamper the performance of the linkage and deteriorate the linkage more quickly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower deck comprising:
   a main body having a front side, a rear side, a left side and a right side, the main body housing one or more cutting blades;
   for each of the left and right sides, a front and a rear rolling mechanism support arm pivotally connected to the main body, each front rolling mechanism support arm supporting a front rolling mechanism with the front rolling mechanism being positioned frontward of a pivoting axis of the front rolling mechanism support arm, each rear rolling mechanism support arm supporting a rear rolling mechanism with the rear rolling mechanism being positioned rearward of a pivoting axis of the rear rolling mechanism support arm;
   a shaft that extends along the front side to couple the front rolling mechanism support arms together; and
   for at least one of the left and right sides, a coupling mechanism that couples the corresponding front rolling mechanism support arm to the corresponding rear rolling mechanism support arm such that, when the shaft is rotated, the front and rear rolling mechanism support arms are pivoted in equal increments, wherein the coupling mechanism comprises a linking member having a front end formed of pivoting portions, a rear end formed of pivoting portions, and one or more rigid bars that extend between the front and rear ends, wherein the pivoting portions of the front end of the linking member are coupled to and conform to a circular edge of the front rolling mechanism support arm at a point that is above the pivoting axis of the front rolling mechanism support arm and wherein the pivoting portions of the rear end of the linking member are coupled to and conform to a circular edge of the rear rolling mechanism support arm at a point that is below the pivoting axis of the rear rolling mechanism support arm.

2. The mower deck of claim 1, wherein the rolling mechanism that each rolling mechanism support arm supports comprises one end of a roller.

3. The mower deck of claim 1, further comprising:
   an actuator that is coupled to the shaft and configured to rotate the shaft.

4. The mower deck of claim 3, wherein the actuator is electronically actuated.

5. The mower deck of claim 1, wherein the front rolling mechanism support arms pivot around an axis of rotation of the shaft.

6. The mower deck of claim 1, wherein the pivoting portions comprise chain links.

7. The mower deck of claim 1, wherein a length of the linking member between the two points is adjustable.

8. The mower deck of claim 1, wherein the coupling mechanism comprises a support member having a front end that is coupled to the front rolling mechanism support arm at a point that is below the pivoting axis of the front rolling mechanism support arm and a rear end that is coupled to the rear rolling mechanism support arm at a point that is above the pivoting axis of the rear rolling mechanism support arm.

9. The mower deck of claim 8, wherein a length of the support member between the two points is adjustable.

10. The mower deck of claim 8, wherein the front end of the support member is formed of pivoting portions, the rear end of the support member is formed of pivoting portions, and the support member includes one or more rigid bars that extend between the front and rear ends, wherein the pivoting portions of the front end of the support member conform to a circular edge of the front rolling mechanism support arm at the point that is below the pivoting axis of the front rolling mechanism support arm and the pivoting portions of the rear end of the support member conform to a circular edge of the rear rolling mechanism support arm at the point that is above the pivoting axis of the rear rolling mechanism support arm.

11. The mower deck of claim 1, wherein a distance between the point where the front end of the linking member couples to the front rolling mechanism support arm and the pivoting axis of the front rolling mechanism support arm matches a distance between the point where the rear end of the linking member couples to the rear rolling mechanism support arm and the pivoting axis of the rear rolling mechanism support arm.

12. The mower deck of claim 1, wherein each of the left and right sides includes the coupling mechanism.

13. The mower deck of claim 1, wherein the rolling mechanism that each rolling mechanism support arm supports comprises a separate wheel.

14. The mower deck of claim 1, wherein only one of the left or right sides includes the coupling mechanism.

15. The mower deck of claim 14, wherein the rear rolling structure support are coupled together.

16. A mower comprising:
   one or more mower decks, each mower deck comprising:
   a main body having a front side, a rear side, a left side and a right side, the main body housing one or more cutting blades;
   for each of the left and right sides, a front and a rear rolling mechanism support arm pivotally connected to the main body, each front rolling mechanism support arm supporting a front rolling mechanism with the front rolling mechanism being positioned frontward of a pivoting axis of the front rolling mechanism support arm, each rear rolling mechanism support arm supporting a rear rolling mechanism with the rear rolling mechanism being positioned rearward of a pivoting axis of the rear rolling mechanism support arm;
   a shaft that extends along the front side to couple the front rolling mechanism support arms together, the shaft having an axis of rotation, the front rolling mechanism support arms being configured to pivot around the axis of rotation when the shaft is rotated; and
   for at least one of the left and right sides, a coupling mechanism that couples the corresponding front rolling mechanism support arm to the corresponding rear rolling mechanism support arm such that, when the shaft is rotated, the front and rear rolling mechanism support arms are pivoted in equal increments, wherein the coupling mechanism comprises a linking member having a front end formed of pivoting portions, a rear end formed of pivoting portions, and one or more rigid bars that extend between the front and rear ends, wherein the pivoting portions of the front end of the linking member are coupled to and conform to a circular edge of the front rolling mechanism support arm at a point that is above the pivoting axis of the front rolling mechanism support arm and wherein the pivoting portions of the rear end of the linking member are coupled to and conform to a circular edge of the rear rolling mechanism support arm at a point that is below the pivoting axis of the rear rolling mechanism support arm.

17. The mower of claim 16, wherein each mower deck further comprises an actuator for rotating the shaft, the mower further comprising:
a control system for providing a control signal to the actuator of each mower deck.

18. The mower of claim 16, wherein the coupling mechanism comprises a support member having a front end that is coupled to the front rolling mechanism support arm at a point that is below the pivoting axis of the front rolling mechanism support arm and a rear end that is coupled to the rear rolling mechanism support arm at a point that is above the pivoting axis of the rear rolling mechanism support arm.

19. The mower of claim 18, wherein the front end of the support member is formed of pivoting portions, the rear end of the support member is formed of pivoting portions, and the support member includes one or more rigid bars that extend between the front and rear ends, wherein the pivoting portions of the front end of the support member conform to a circular edge of the front rolling mechanism support arm at the point that is below the pivoting axis of the front rolling mechanism support arm and the pivoting portions of the rear end of the support member conform to a circular edge of the rear rolling mechanism support arm at the point that is above the pivoting axis of the rear rolling mechanism support arm.

20. A mower deck comprising:
a main body housing one or more cutting blades;
a first pair of front and rear rolling mechanism support arms that are pivotally connected to a first side of the main body;
a second pair of front and rear rolling mechanism support arms that are pivotally connected to a second side of the main body opposite the first side;
a first coupling mechanism for the first pair of front and rear rolling mechanism support arms, the first coupling mechanism coupling the front rolling mechanism support arm to the rear rolling mechanism support arm such that, when the front rolling mechanism support arm is pivoted, the rear rolling mechanism support arm is also pivoted to cause a height of rolling mechanisms coupled to the front and rear rolling mechanism support arms to be adjusted equally, wherein the first coupling mechanism comprises a first linking member having a front end formed of pivoting portions, a rear end formed of pivoting portions, and one or more rigid bars that extend between the front and rear ends, wherein the pivoting portions of the front end of the first linking member are coupled to and conform to a circular edge of the front rolling mechanism support arm at a point that is above a pivoting axis of the front rolling mechanism support arm and wherein the pivoting portions of the rear end of the first linking member are coupled to and conform to a circular edge of the rear rolling mechanism support arm at a point that is below a pivoting axis of the rear rolling mechanism support arm;
a second coupling mechanism for the second pair of front and rear rolling mechanism support arms, the second coupling mechanism coupling the front rolling mechanism support arm to the rear rolling mechanism support arm such that, when the front rolling mechanism support arm is pivoted, the rear rolling mechanism support arm is also pivoted to cause a height of rolling mechanisms coupled to the front and rear rolling mechanism support arms to be adjusted equally, wherein the second coupling mechanism comprises a second linking member having a front end formed of pivoting portions, a rear end formed of pivoting portions, and one or more rigid bars that extend between the front and rear ends, wherein the pivoting portions of the front end of the second linking member are coupled to and conform to a circular edge of the front rolling mechanism support arm at a point that is above the pivoting axis of the front rolling mechanism support arm and wherein the pivoting portions of the rear end of the second linking member are coupled to and conform to a circular edge of the rear rolling mechanism support arm at a point that is below the pivoting axis of the rear rolling mechanism support arm; and
a shaft extending between the first and second sides of the main body and having an axis of rotation, the front rolling mechanism support arms being coupled to opposing ends of the shaft such that, when the shaft is rotated around the axis of rotation, the front rolling mechanism support arms pivot around the axis of rotation.

* * * * *